(12) United States Patent
Robertson, Jr. et al.

(10) Patent No.: US 12,736,807 B2
(45) Date of Patent: Sep. 15, 2026

(54) ENHANCED WINDSHIELD DISPLAY FOR VEHICLES

(71) Applicant: Ford Global Technologies, LLC, Dearborn, MI (US)

(72) Inventors: Michael Robertson, Jr., West Bloomfield, MI (US); Segundo Baldovino, Novi, MI (US); Aaron Bradley Johnson, Allen Park, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 191 days.

(21) Appl. No.: 18/818,796

(22) Filed: Aug. 29, 2024

(65) Prior Publication Data

US 2026/0063897 A1 Mar. 5, 2026

(51) Int. Cl.

| | |
|---|---|
| ***G02B 27/01*** | (2006.01) |
| ***B60J 1/00*** | (2006.01) |
| ***B60K 35/231*** | (2024.01) |
| ***B60R 1/12*** | (2006.01) |

(52) U.S. Cl.

CPC .......... *G02B 27/0101* (2013.01); *B60J 1/001* (2013.01); *B60K 35/231* (2024.01); *B60R 1/12* (2013.01); *B60R 2001/1215* (2013.01); *G02B 2027/0112* (2013.01)

(58) Field of Classification Search

CPC .......................... B60K 2360/334; B60K 35/60

USPC .......................................................... 359/630

See application file for complete search history.

(56) References Cited

U.S. PATENT DOCUMENTS

| | | | | |
|---|---|---|---|---|
| 5,812,332 | A * | 9/1998 | Freeman | B32B 17/10761 428/56 |
| 8,487,277 | B2 | 7/2013 | Labrot et al. | |
| 8,830,141 | B2 | 9/2014 | Seder et al. | |
| 9,857,571 | B2 | 1/2018 | Sablayrolles et al. | |
| 11,711,967 | B2 * | 7/2023 | Wheeler | H10K 85/30 |
| 2011/0073773 | A1 | 3/2011 | Labrot et al. | |
| 2023/0278309 | A1 * | 9/2023 | Koran | B32B 1/00 428/172 |
| 2024/0083146 | A1 | 3/2024 | Hagen et al. | |
| 2024/0337838 | A1 * | 10/2024 | Hejda | B60K 37/10 |

FOREIGN PATENT DOCUMENTS

| | | | |
|---|---|---|---|
| WO | 2023232475 | A1 | 12/2023 |

* cited by examiner

*Primary Examiner* — Lin Ye

(74) *Attorney, Agent, or Firm* — Vichit Chea; Price Heneveld LLP

(57) ABSTRACT

An autonomous vehicle includes a window having first and second layers of polymer material between inner and outer layers of glass. The first layer of polymer material includes perovskite crystals that are activated by UV light and emit visible light. The second layer of polymer material is disposed between the outer layer of glass and the first layer of polymer material. The second layer of polymer material blocks UV sunlight to prevent activation of the perovskite crystals. The vehicle further includes a projector that is configured to project UV light onto the inside of the window to form illuminated images on the window.

20 Claims, 4 Drawing Sheets

ENHANCED WINDSHIELD DISPLAY FOR VEHICLES

FIELD OF THE DISCLOSURE

The present disclosure generally relates to vehicle displays, and more particularly to a vehicle display including a projector that projects light onto a window of a vehicle.

BACKGROUND OF THE DISCLOSURE

Various types of vehicle displays have been developed. For example, displays may be mounted in a vehicle dashboard. Heads up displays on windshields have also been developed.

SUMMARY OF THE DISCLOSURE

An aspect of the present disclosure is a vehicle including a body having a cabin. The vehicle may optionally comprise an autonomous vehicle that does not require direct control by a driver during at least some vehicle operation on roads and the like. The vehicle further includes a window having inner and outer layers of glass on an inside and an outside, respectively, of the window. The window includes a first layer of polymer material between the inner and outer layers of glass. At least a portion of the first layer of polymer material includes perovskite nanocrystals that are activated by UV light in the range of about 340 nm-about 380 nm, and emit visible light having a wavelength in the range of about 450 nm-about 750 nm. The window includes a second layer of polymer material between the outer layer of glass and the first layer of polymer material. At least a portion of the second layer of polymer material blocks UV light having wavelength of 400 nm or less to prevent activation of the perovskite nanocrystals by UV sunlight that is incident on the outer layer of glass. The vehicle further includes a projector mounted in the cabin. The projector is configured to project UV light having a wavelength in the range of about 340 nm-about 380 nm onto the inside of the window to selectively activate the perovskite crystals and form illuminated images on the window that are visible from inside the cabin.

The projector may optionally include first, second, and third light sources that project light have frequencies of about 340 nm, about 360 nm, and about 380 nm, respectively, onto the inside of the window.

One or more of the first, second, and third light sources may optionally comprise lasers.

The perovskite nanocrystals may be several nanometers in size or less.

The first layer of polymer material may include: 1) first perovskite crystals that are activated by UV light of a first UV wavelength and emit blue light; 2) second perovskite crystals that are activated by UV light of a second UV wavelength and emit green light; and: 3) third perovskite crystals that are activated by UV light of third wavelength and emit red light. The projector may be configured to selectively project at least first, second and third UV wavelengths onto the inside of the window.

The first UV wavelength may be about 330 nm-about 350 nm, the second UV wavelength may be about 350 nm-about 370 nm, and the third UV wavelength may be about 370 nm-about 390 nm.

The first UV wavelength may be about 340 nm, the second UV wavelength may be about 360 nm, and the third UV wavelength may be about 380 nm.

The blue light may have a wavelength of about 450 nm, the green light may have a wavelength of about 540 nm, and the red light may have a wavelength of about 750 nm.

The window may include a layer of acoustic polyvinyl butyral (PVB) disposed between the first and second layers of polymer material to provide sound insulation.

The perovskite nanocrystals of at least one of the first and second layers of polymer material may be compounded into the polymer material prior to extruding the compounded material to form a sheet.

At least one of the first and second layers of polymer material may comprise a main layer of polymer material that is free of perovskite nanocrystals. The perovskite nanocrystals may be disposed in a layer of material that is disposed on at least one side of the main layer of polymer material.

Another aspect of the present disclosure is a vehicle including a body having a cabin, and a window including inner and outer layers of glass on an inside and an outside, respectively of the window. The window further includes: 1) a first layer of polymer material between the inner and outer layers of glass, wherein at least a portion of the first layer of polymer material includes perovskite crystals that are activated by UV light having first, second, and third wavelengths, and emit blue, green, and red visible light, respectively, and: 2) a second layer of polymer material between the outer layer of glass and the first layer of polymer material. At least a portion of the second layer of polymer material blocks UV light having a wavelength of about 400 nm or less to prevent activation of the perovskite crystals by UV light from sunlight that is incident on the outer layer of glass. The vehicle includes a projector mounted in the cabin. The projector is configured to project UV light having the first, second, and third wavelengths onto the inside of the window to selectively activate the perovskite crystals and form an illuminated image on the window that is visible from the inside the cabin. At least some portions of the illuminated image are formed by blue, green, and red light emitted by the perovskite crystals.

The UV light from the projector may be in the range of about 340 nm-about 380 nm.

The projector includes first, second, and third light sources that project light having frequencies of about 340 nm, about 360 nm, and about 380 nm, respectively, onto the inside of the window.

The first UV wavelength is about 330 nm-about 350 nm, the second UV wavelength is about 350 nm-about 370 nm, and the third UV wavelength is about 370 nm-about 390 nm.

The first UV wavelength is about 340 nm, the second UV wavelength is about 360 nm, and the third UV wavelength is about 380 nm.

The window may optionally comprise a windshield and the vehicle may optionally include a rearview mirror. The projector may be integrated into the rearview mirror, and may project light onto an inside surface of the windshield.

The body may include a roof structure, and the window may comprise roof glass that extends over at least a portion of the cabin. The projector may be mounted to the roof structure to project light onto a lower side of the roof glass.

The window may optionally comprise a plurality of windows selected from the group consisting of a windshield, a rear window, roof glass, a right side window, and a left side window. The projector may be configured to project light onto the plurality of windows.

Another aspect of the present disclosure is a method of providing an illuminated image on a window of a vehicle. The method includes providing the vehicle with a window including inner and outer layers of glass on an inside and an outside, respectively, of the window. The window further includes: 1) a first layer of polymer material between the inner and outer layers of glass, wherein the first layer of polymer material includes perovskite crystals that are activated by UV light and emit visible light, and: 2) a second layer of polymer material between the outer layer of glass and the first layer of polymer material, wherein the second layer of polymer material blocks UV light from sunlight that is incident on the outer layer of glass to prevent activation of the perovskite crystals. The method further includes utilizing a projector mounted in the cabin to project light having a wavelength in the range of about 340 nm-about 380 nm onto the inside of the window to activate the perovskite crystals and form an illuminated image on the window that is visible from inside the cabin.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
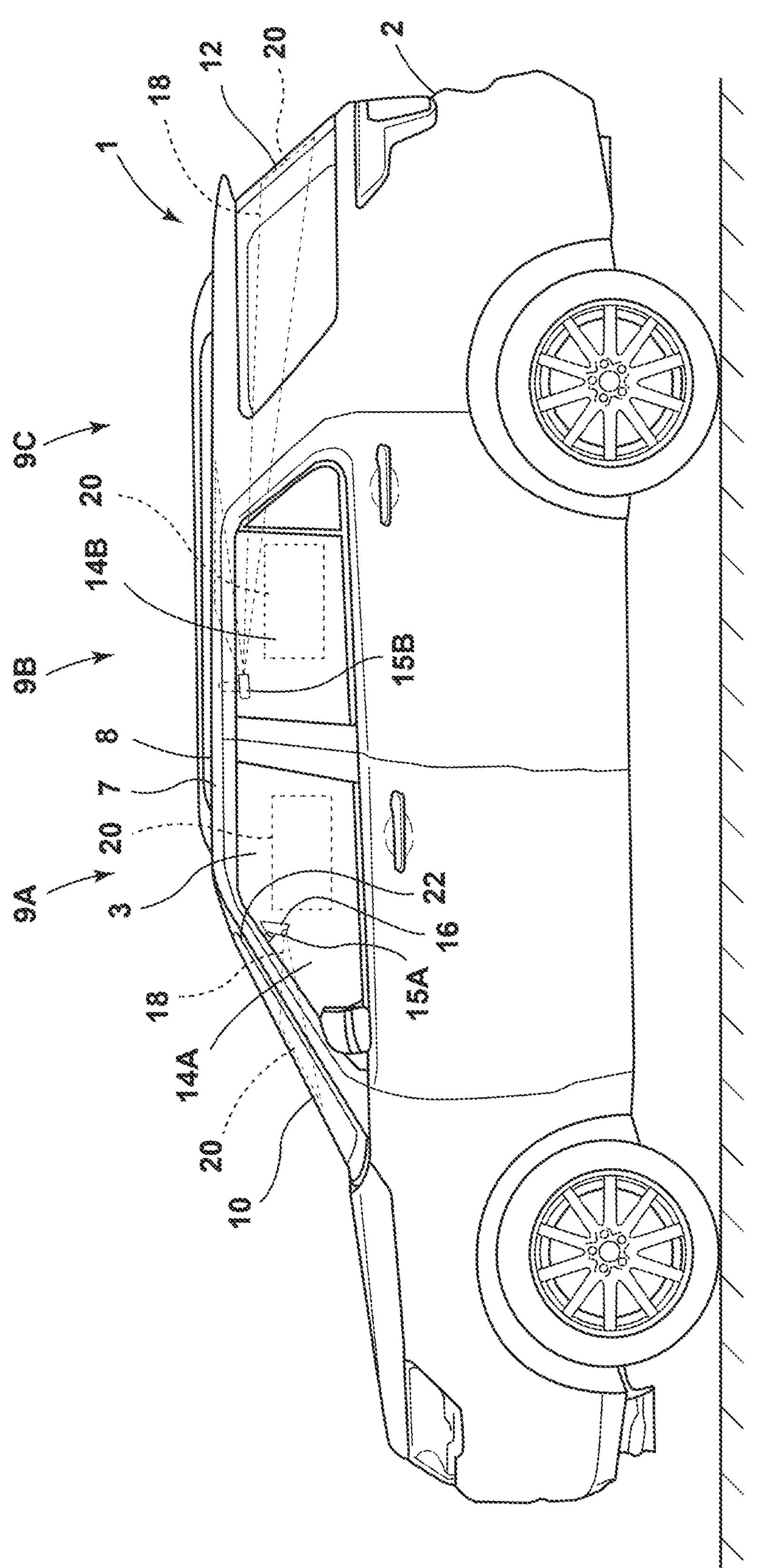
FIG. 1 is a side elevational view of a vehicle according to an aspect of the present disclosure.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle display. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the terms "or" and "and/or," when used in a list of two or more items, means that any one of the listed items can be employed by itself, or any combination of two or more of the listed items can be employed. For example, if a composition or device is described as containing or comprising components A, B, or C, the composition or device can contain (include) A alone; B alone; C alone; A and B in combination; A and C in combination; B and C in combination; or A, B, and C in combination. If a composition or device is described as containing or comprising components A and/or B and/or C, the composition or device can contain (include) A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," "including" or any other variation thereof, are intended to cover a non-exclusive inclusion, such that a process, method, article, or apparatus that includes or comprises a list of elements does not include only those elements but may include other elements not expressly listed or inherent to such process, method, article, or apparatus. An element preceded by "comprises . . . a" or "includes . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
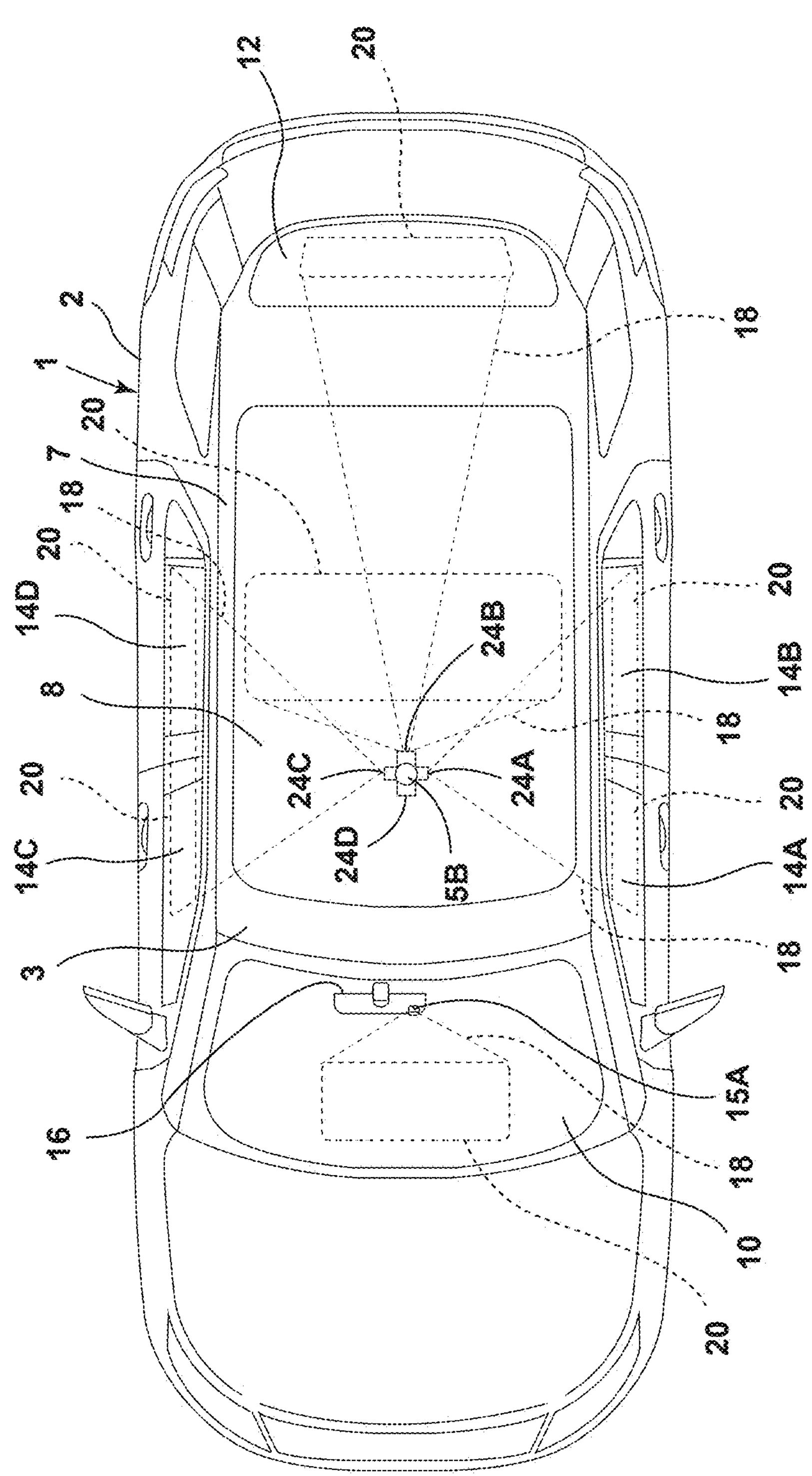
FIG. 2 is a top plan view of the vehicle of FIG. 1.

With reference to FIGS. 1 and 2, a vehicle 1 according to an aspect of the present disclosure includes a body structure 2 and a cabin 3. The vehicle cabin may include first, second, and third rows of seats 9A-9C, respectively. As discussed in more detail below in connection with FIG. 4, vehicle 1 may optionally comprise an autonomous vehicle that is configured to wirelessly communicate with, for example, a satellite 4, and/or a cell tower 5, and/or a cloud server 6, and/or other devices.

Vehicle 1 may include a window such as roof glass 8 disposed in a roof structure 7, a windshield 10, a rear window 12, and one or more side windows 14A-14D. Vehicle 1 may also include a projector 15A that is integrated into a rearview mirror 16. Projector 15A projects light 20 onto an inner surface 22 of windshield 10 to form an illuminated image 20 on windshield 10 that is visible from inside the cabin 3 of vehicle 1. If vehicle 1 comprises an autonomous vehicle, the illuminated image 20 may comprise, for example, video entertainment content that is displayed while the vehicle 1 is operating in an autonomous mode.

Vehicle 1 may include a projector 15B in addition to projector 15A, or instead of projector 15A. As used herein, "projector" and "projector 15" generally refer to any projector that is configured to project light onto an interior surface of at least one window. Projector 15B may be mounted to roof structure 7, and projector 15B may be configured to project light 18 onto roof glass 8, and/or windshield 10, and/or rear window glass 12, and/or one or more of side windows 14A-14C to form illuminated images 20. Projector 15B may include one or more individual projectors 24A-24D that are configured to project light 18 onto one or more of roof glass 18, and/or rear window glass 12, and/or side windows 14A-14D. Alternatively, projector 15B may include a single projector (e.g. projector 24A), and the projector 15B may be movably mounted to the roof structure whereby the individual projector can be moved to direct light 18 onto a selected one of the windows 8, 10, 12, and/or 14A-14D. Alternatively, vehicle 1 may include only a single window (e.g. windshield) that is configured to provide images 20 when light from projector 15A and/or 15B is projected onto the window.

Projectors 15A and/or 15B may be configured to project light 18 at three distinct wavelengths to selectively activate perovskite crystals of one or more of the windows (e.g. roof glass 8 and/or windshield 10 and/or rear window 12, and/or side windows 14A-14D) to form illuminated image 20. For example, the projectors 15A and/or 15B may be configured to project light 18 having a first wavelength of about 320-about 350 nm, a second wavelength of about 340-about 370 nm, and a third wavelength of about 370-about 390 nm. As discussed in more detail below, the window glass may include perovskite crystals that emit blue, green, and red light in response to light from the projectors 15A and/or 15B at the first, second, and third frequencies, respectively. This permits the system to provide illuminated images 20 having a wide range of colors. In general, the illuminated images 20 may comprise static images in the form of, for example text (e.g. "Welcome" or "Thirteen minutes until arrival") and/or images or patterns that may be decorative or informative. The illuminated images 20 may also comprise video images such as movies or the like. Vehicle 1 may include an audio system (not specifically shown) to provide audio corresponding to illuminated static images and/or video images whereby those in the vehicle 1 can watch movies and/or other videos accompanied by audio.

Figure 3:
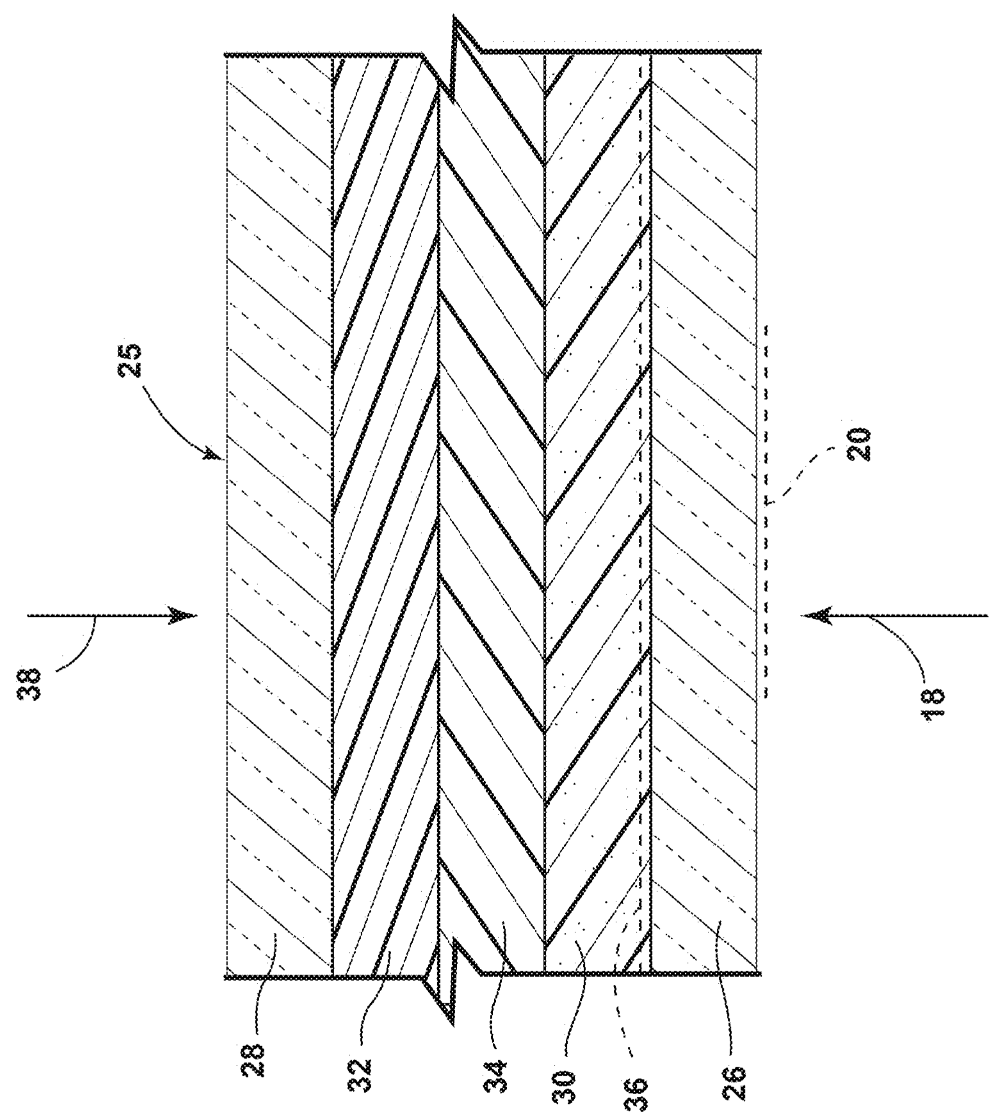
FIG. 3 is a partially fragmentary cross-sectional view of a window according to an aspect of the present disclosure.

With further reference to FIG. 3, a window 25 may include a first or inner layer of glass 26, a second or outer layer of glass 28, a first layer of polymer material 30 between the inner and outer layers of glass 26 and 28, respectively, and a second layer of polymer material 32 between the outer layer of glass 28 and the first layer of polymer material 30. Window 25 may optionally include a central layer 34 of polymer material that provides increased sound insulation. The construction of window 25 may be utilized in virtually any vehicle window, including one or more of the roof glass 8 and/or windshield 10 and/or rear window 14 and/or side windows 14A-14D of FIGS. 1 and 2.

The first polymer layer 30 may comprise a suitable polymer such as polyvinyl butyral (PVB) having perovskite particles disposed in the PVB material. The perovskite crystals may be embedded within first polymer layer 30 by compounding (mixing) a polymer material with perovskite crystals, and the compounded material may then be extruded to form a sheet. Alternatively, first polymer layer 30 may comprise a main polymer layer (e.g. PVB) that is free of perovskite crystals, and a coating 36 having perovskite crystals disposed in the coating layer 36. For example, perovskite crystals may be added to transparent ink or painted or sprayed on one side of a layer or sheet of polymer material that is substantially free of perovskite crystals to form coating layer 36. The perovskite crystals may comprise nanocrystals having an average size on the order of several (e.g. 1, 2, 3, 4, 5, 6, 7, 8, 9, 10, 20, 04 30) nanometers.

First polymer layer 30 may include three distinct types of perovskite phosphorescent materials, which may be in the form of nanoparticles that may have a size that is several nanometers in size. A first type of perovskite crystals may be configured to be activated by UV light in the range of about 330 nm-about 350 nm and emit blue light. For example, the first perovskite crystals may be activated by UV light of about 340 nm, and may emit blue light of about 450 nm. The second type of perovskite crystals may be activated by UV light of about 350 nm to about 370 nm, and emit green light. For example, the second perovskite crystals may be activated by UV light of about 360 nm, and emit green light at about 540 nm. A third type of perovskite crystals of first polymer layer 30 may be activated with UV light of about 370 nm to about 390 nm, and emit red light. For example, the third type of perovskite crystal may be activated by UV light of about 380 nm, and may emit red light at about 750 nm. It will be understood that the frequency of UV light to cause emission of light having specific frequencies may be adjusted by selecting perovskite crystals that emit light having the desired frequencies in response to a selected UV light frequency. The three types of perovskite crystals may be compounded in a polymer material and extruded into a sheet as described above, or the three types of perovskite crystals may be deposited onto a side of the first polymer layer 30 to form a coating layer 36 as also described above.

The second layer of polymer material 32 includes UVA inhibitors that block light with wavelengths less than a selected wavelength. Preferably, the second polymer layer 32 blocks light with wavelengths less than about 380 nm, or less than about 400 nm. The UVA inhibitor may comprise, for example, benzotriazole or benzafone, or other suitable inhibitor. In general, UVA inhibitors used in known vehicle glass may block light of less than about 370 nm in wavelength to allow the full visible spectrum of light to go through the glass (e.g. windshield). However, the second polymer layer 32 preferably blocks light at somewhat greater wavelengths (e.g. 380 nm or 400 nm) to ensure that UV light from sunlight 38 does not travel through second polymer layer 32 and activate the perovskite crystals of first polymer layer 30. Thus, in contrast to known window glass, a window according to the present disclosure may block some visible light (e.g. visible light of about 370 nm-about 380 nm, or about 370 nm-about 400 nm) in addition to blocking UV light of less than about 370 nm.

The central layer 34 may comprise a PVB material that is configured to absorb sound. The polymer layers 30, 32, and 34 may be configured to provide a desired degree of sound reduction while providing the desired display layer. In general, the central layer 34 may comprise a PVB material that is softer than the material of layers 30 and 32 to provide increased sound absorption. However, the first polymer layer 30 may comprise a PVB material that is softer than the PVB material of the central layer 34 to extend sound reduction above about 5,000 Hz. In general, perovskite crystals may be disposed only in first polymer layer 30, only in central layer 34, or in both layers 30 and 34. Although the layers 30, 32, and 34 preferably comprise a PVB polymer material, one or more of the layers 30, 32, and/or 34 may comprise other suitable polymers or materials, and the present disclosure is not limited to PVB materials.

Figure 4:
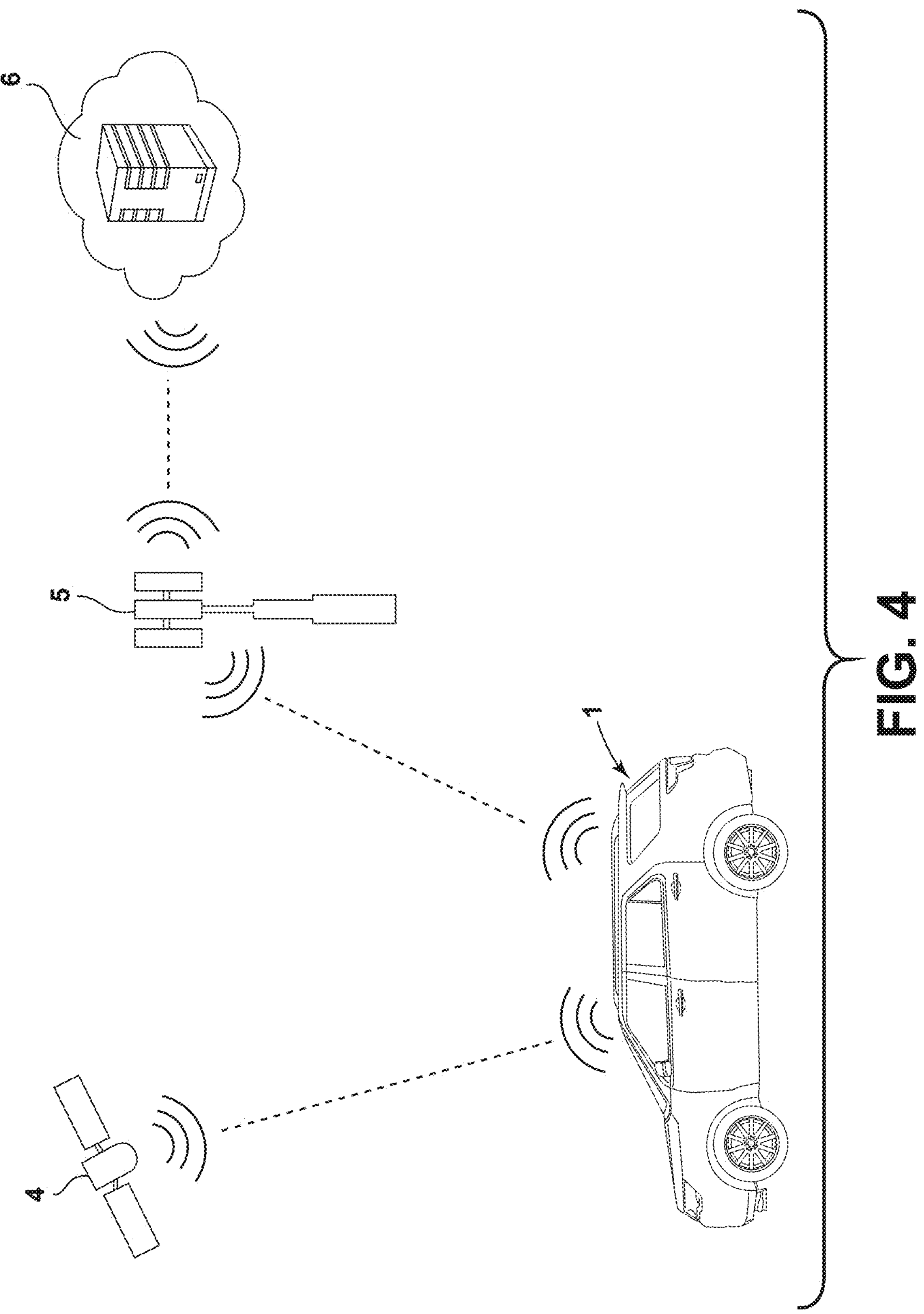
FIG. 4 is a schematic of a vehicle according to an aspect of the present disclosure.

With further reference to FIG. 4, vehicle 1 may be configured to communicate with an Automatic Vehicle Location (AVL) system, which may include one or more of a satellite 4, a cell tower 5, cloud server 6, and/or other devices. The vehicle 1 may be configured to utilize data from one or more sources to provide audio and/or video entertainment to individuals in vehicle 1. For example, images 20 in the form of videos on roof glass 8 (FIG. 2) may provide entertainment for users positioned in one or more of a first row 9A, second row 9B, or third row 9C of vehicle 1.

In contrast to known heads up displays (HUD) that are limited to windshields of vehicles, the display system of the present disclosure may provide images 20 on, for example, roof glass 8 that may be visible to those in second and third rows of seats 9B and 9C. If the vehicle 1 comprises an autonomous vehicle, users in all three rows 9A-9C may simultaneously view images 20 on roof glass 8 to thereby provide information and/or entertainment to all those in vehicle 1.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An autonomous vehicle comprising:

a body having a cabin;

a window including inner and outer layers of glass on an inside and an outside, respectively, of the window, the window further including: 1) a first layer of polymer material between the inner and outer layers of glass, at least a portion of the first layer of polymer material including perovskite nanocrystals that are activated by UV light in the range of 340 nm-380 nm, and emit visible light having a wavelength in the range of 450 nm-750 nm, and: 2) a second layer of polymer material between the outer layer of glass and the first layer of polymer material, wherein at least a portion of the second layer of polymer material blocks UV light having a wavelength of 400 nm or less to prevent activation of the perovskite nanocrystals by UV sunlight that is incident on the outer layer of glass; and a projector mounted in the cabin, wherein the projector is configured to project UV light having a wavelength in the range of 340 nm-380 nm onto the inside of the window to selectively activate the perovskite crystals and form illuminated images on the window that are visible from inside the cabin.

2. The autonomous vehicle of claim 1, wherein:

the projector includes first, second, and third light sources that project light having frequencies of 340 nm, 360 nm, and 380 nm, respectively, onto the inside of the window.

3. The autonomous vehicle of claim 2, wherein:

each of the first, second, and third light sources comprise lasers.

4. The autonomous vehicle of claim 1, wherein:

the perovskite nanocrystals are several nanometers in size or less, on average.

5. The autonomous vehicle of claim 1, wherein:

the first layer of polymer material includes:

1) first perovskite nanocrystals that are activated by UV light of a first UV wavelength and emit blue light;

2) second perovskite crystals that are activated by UV light of a second UV wavelength and emit green light;

3) third perovskite crystals that are activated by UV light of a third wavelength and emit red light; and wherein the projector is configured to selectively project at the first, second, and third UV wavelengths onto the inside of the window.

6. The autonomous vehicle of claim 5, wherein:

the first UV wavelength is 330 nm-350 nm, the second UV wavelength is 350 nm-370 nm, and the third UV wavelength is 370 nm-390 nm.

7. The autonomous vehicle of claim 6, wherein:

the first UV wavelength is 340 nm, the second UV wavelength is 360 nm, and the third UV wavelength is 380 nm.

8. The autonomous vehicle of claim 7, wherein:

the blue light has a wavelength of 450 nm, the green light has a wavelength of 540 nm, and the red light has a wavelength of 750 nm.

9. The autonomous vehicle of claim 1, wherein:

the window includes a layer of acoustic polyvinyl butyral (PVB) disposed between the first and second layers of polymer material to provide sound insulation.

10. The autonomous vehicle of claim 1, wherein:

the perovskite nanocrystals of at least one of the first and second layers of polymer material are compounded into the polymer material prior to extruding the compounded material to form a sheet.

11. The autonomous vehicle of claim 1, wherein:

at least one of the first and second layers of polymer material comprise a main layer of polymer material that is free of perovskite nanocrystals, and the perovskite nanocrystals are disposed in a layer of material disposed on at least one side of the main layer of polymer material.

12. A vehicle comprising:

a body having a cabin;

a window including inner and outer layers of glass on an inside and an outside, respectively, of the window, the window further including: 1) a first layer of polymer material between the inner and outer layers of glass, at least a portion of the first layer of polymer material including perovskite crystals that are activated by UV light having first, second, and third wavelengths, and emit blue, green, and red visible light, respectively, and: 2) a second layer of polymer material between the outer layer of glass and the first layer of polymer material wherein at least a portion of the second layer of polymer material blocks UV light having a wavelength of 400 nm or less to prevent activation of the perovskite crystals by UV light from sunlight that is incident on the outer layer of glass; and a projector mounted in the cabin, wherein the projector is configured to project UV light having the first, second, and third wavelengths onto the inside of the window to selectively activate the perovskite crystals and form an illuminated image on the window that is visible from inside the cabin, wherein portions of the illuminated image are formed by blue, green, and red light emitted by the perovskite crystals.

13. The vehicle of claim 12, wherein:

the UV light from the projector is in the range of 340 nm-380 nm.

14. The vehicle of claim 13, wherein:

the projector includes first, second, and third light sources that project light having frequencies of 340 nm, 360 nm, and 380 nm, respectively, onto the inside of the window.

15. The vehicle of claim 12, wherein:

the first UV wavelength is 330 nm-350 nm, the second UV wavelength is 350 nm-370 nm, and the third UV wavelength is 370 nm-390 nm.

16. The vehicle of claim 15, wherein:

the first UV wavelength is 340 nm, the second UV wavelength is 360 nm, and the third UV wavelength is 380 nm.

17. The vehicle of claim 12, wherein:

the window comprises a windshield;

the vehicle includes a rearview mirror; and the projector is integrated into the rearview mirror to project light onto an inside surface of the windshield.

18. The vehicle of claim 12, wherein:

the body includes a roof structure;

the window comprises roof glass extending over at least a portion of the cabin;

the projector is mounted to the roof structure to project light onto a lower side of the roof glass.

19. The vehicle of claim 12, wherein:

the window comprise a plurality of windows selected from the group consisting of a windshield, a rear window, roof glass, a right side window, and a left side window; and the projector is configured to project light onto the plurality of windows.

20. A method of providing an illuminated image on a window of a vehicle, the method comprising:

providing the vehicle with a window including inner and outer layers of glass on an inside and an outside, respectively, of the window, the window further including: 1) a first layer of polymer material between the inner and outer layers of glass, the first layer of polymer material including perovskite crystals that are activated by UV light and emit visible light, and: 2) a second layer of polymer material between the outer layer of glass and the first layer of polymer material, wherein the second layer of polymer material blocks UV light from sunlight that is incident on the outer layer of glass whereby the perovskite crystals do not emit light due to sunlight that is incident on the outer layer of glass; and utilizing a projector mounted in the cabin to project light having a wavelength in the range of 340 nm-380 nm onto the inside of the window to activate the perovskite crystals and form an illuminated image on the window that is visible from inside the cabin.

* * * * *